United States Patent [19]

Horton

[11] Patent Number: 4,494,528

[45] Date of Patent: Jan. 22, 1985

[54] SOLAR HEATING SYSTEM FOR BEEHIVES AND OTHER ENCLOSURES

[76] Inventor: David J. Horton, 452 Ezie St., San Jose, Calif. 95111

[21] Appl. No.: 510,550

[22] Filed: Jul. 5, 1983

[51] Int. Cl.³ .......................... F24J 3/02; A01K 47/00
[52] U.S. Cl. .................................... 126/429; 126/450; 126/434; 6/1
[58] Field of Search .................. 126/450, 429, 434; 6/1, 4 R; 98/2.04

[56] References Cited

U.S. PATENT DOCUMENTS

| | | | |
|---|---|---|---|
| 2,150,110 | 3/1939 | Strauss et al. | 98/2.04 |
| 3,994,034 | 11/1976 | Van Damme et al. | 6/1 |
| 4,068,652 | 1/1978 | Worthington | 126/429 X |
| 4,100,914 | 7/1978 | Williams | 126/429 |
| 4,233,961 | 11/1980 | Kelly | 126/430 X |
| 4,287,878 | 9/1981 | Holley et al. | 126/429 |
| 4,300,250 | 11/1981 | Taylor | 6/4 R X |
| 4,300,532 | 11/1981 | Olsen | 126/429 X |
| 4,327,795 | 5/1982 | Wheeler | 126/429 X |

Primary Examiner—Larry Jones
Attorney, Agent, or Firm—Paul L. Hickman

[57] ABSTRACT

A solar heating system characterized by a fixed base assembly and a movable collector assembly coupled to the base assembly such that it can move between a closed position and an heating position. The base assembly and is designed to fit an opening provided in an enclosure. The collector assembly is hinged to the base assembly such that it covers the base assembly when in the closed position and such that it is angled towards the sun when in the open position. Cool air is drawn from within the enclosure through ducts, and is heated within the collector assembly and returned to the enclosure. The warm air ducts and the cool air ducts of the two assemblies are connected together only when the collector assembly is in its heating position. Solar wings can help direct solar radiation to the collector assembly, and a reflective material can be attached to the back of the collector assembly to reflect unwanted heat away from the solar heating system.

13 Claims, 6 Drawing Figures

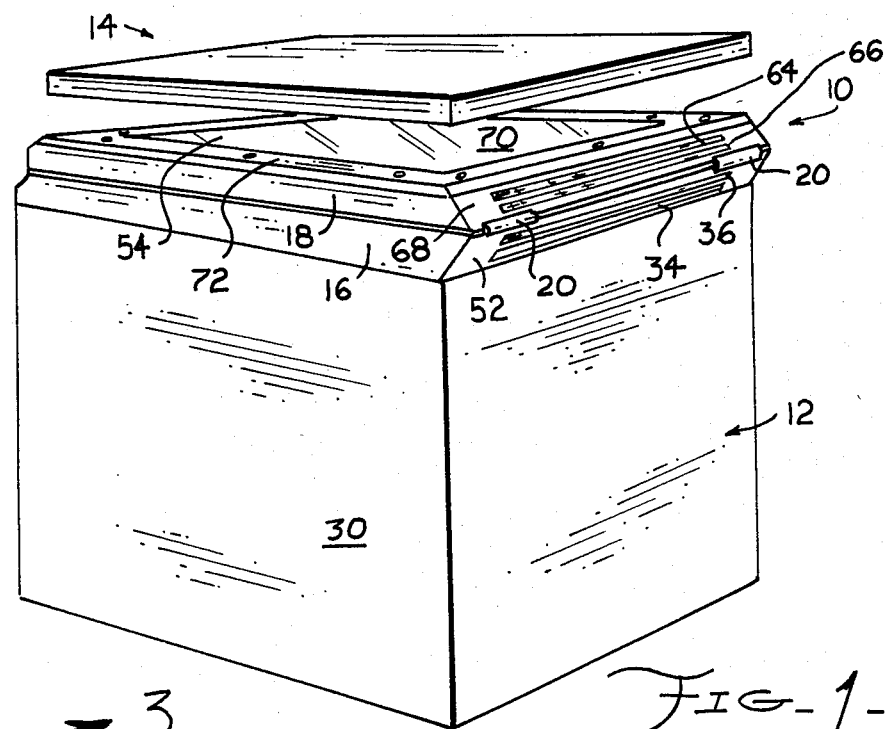
FIG-1-
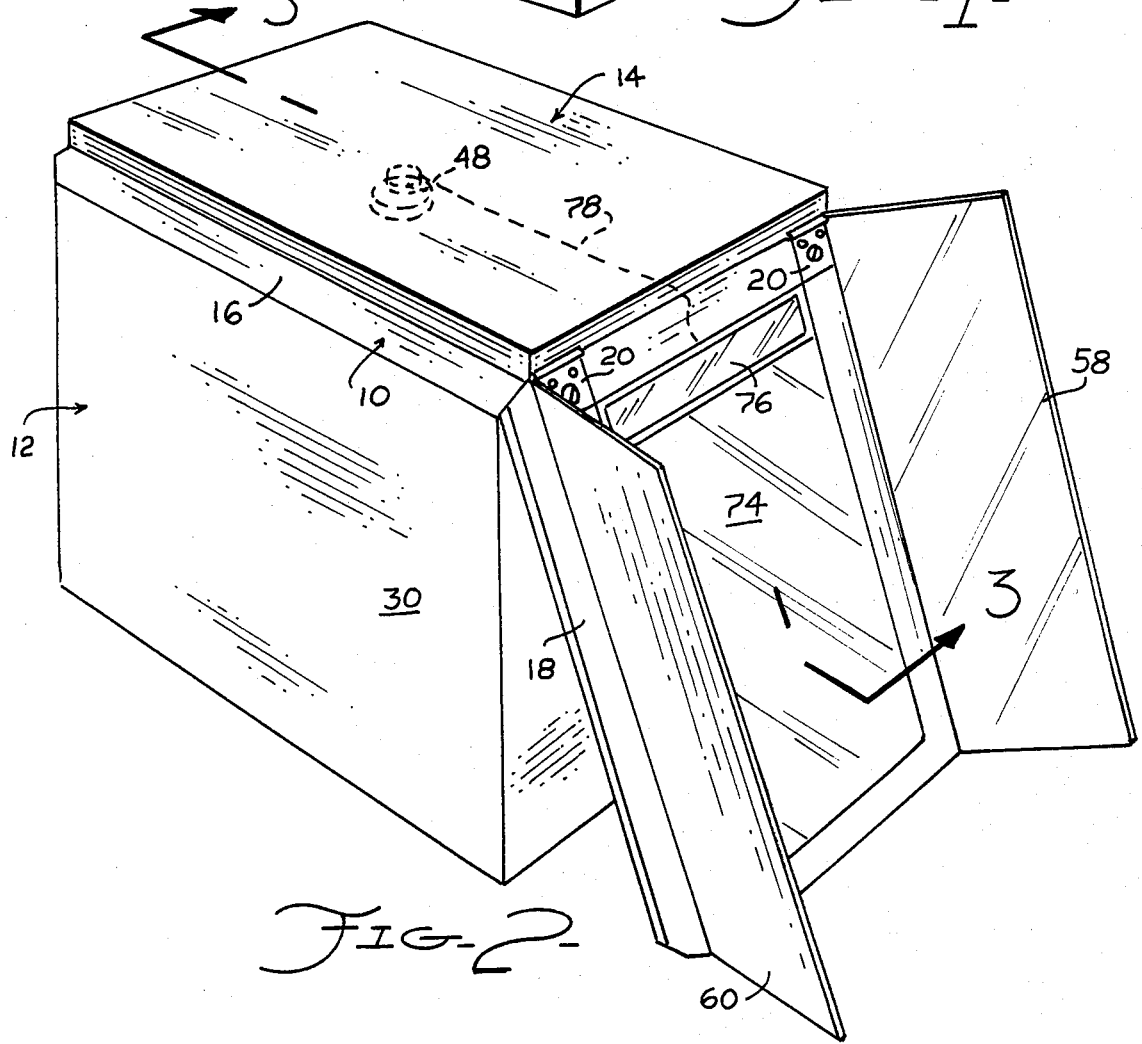
FIG-2-

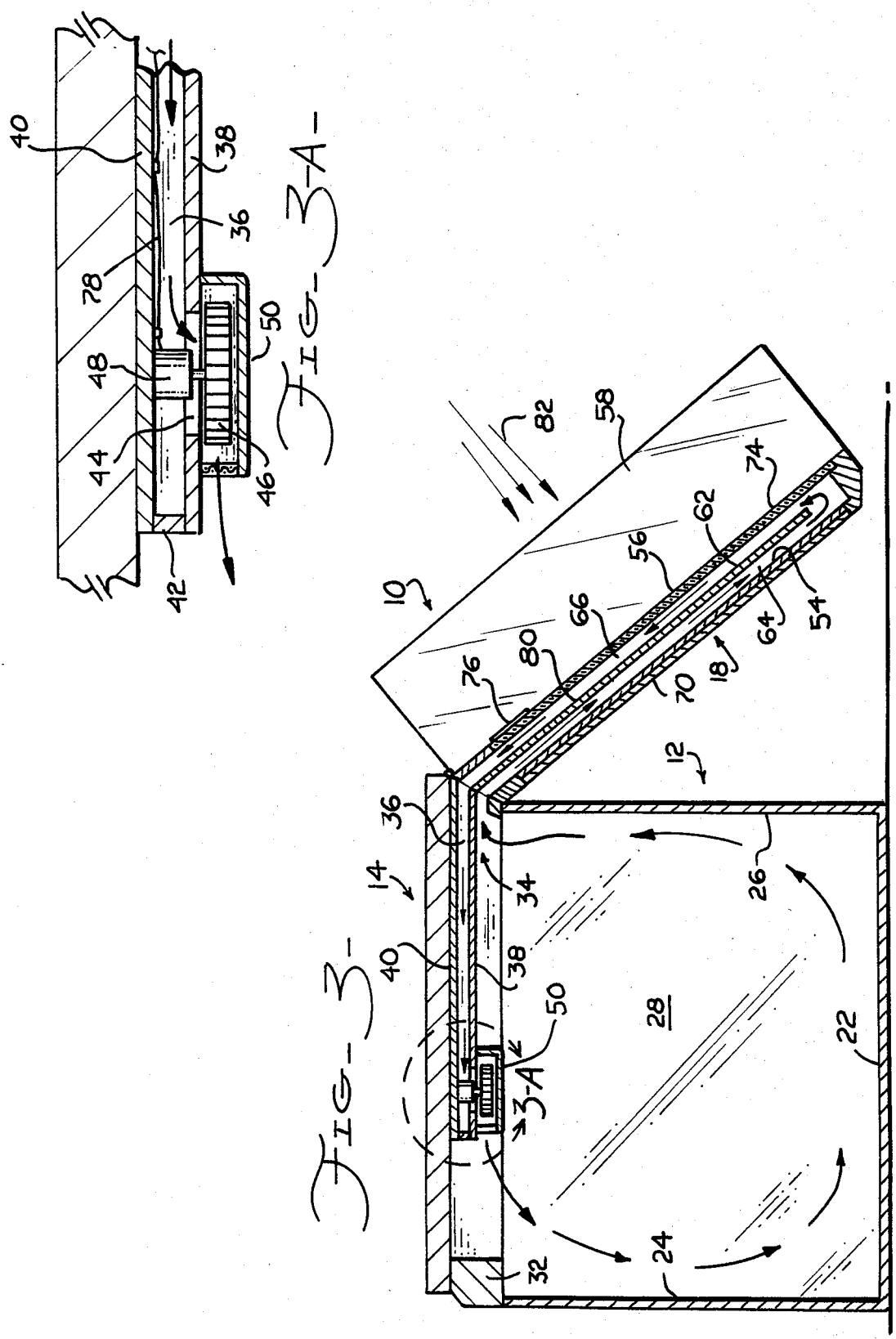

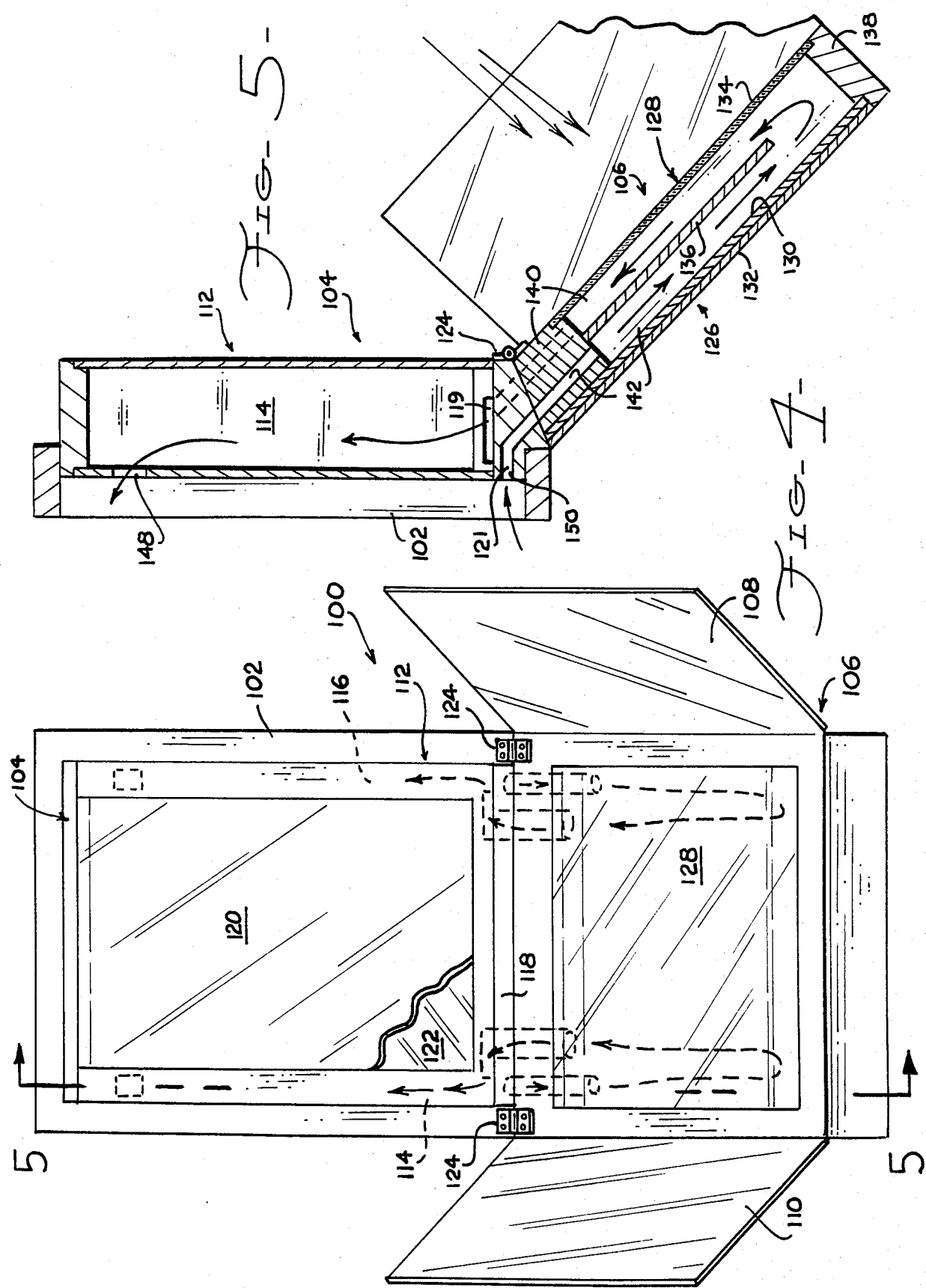

SOLAR HEATING SYSTEM FOR BEEHIVES AND OTHER ENCLOSURES

BACKGROUND OF THE INVENTION

1. Field of the Invention

This invention relates generally to solar heating systems, and more particularly to solar heating systems that utilize air as a heat transfer medium.

2. Description of the Prior Art

Most solar heat collections systems utilize the infrared radiation of the sun to raise the temperature of a working fluid. Water and air are by far the two most common working fluids for solar heating systems.

A solar heat collection panel is the part of a solar heating system which actually absorbs the solar radiation and typically includes a frame covered with a piece of glass or other transparent material. Solar radiation is transmitted through the glass and impinges heat absorptive surfaces to raise the temperature of those surfaces. The working fluid flows past these heat absorptive surfaces to cause a transfer of heat. The fluid is then put to a useful purpose, such as to heat a home or hot water supply.

The working fluid can be caused to flow past the heat absorptive surfaces by mechanical means such as a pump or fan, or can be caused to flow past the heat absorptive surfaces by intrinsic thermodynamic forces. For example, one type of solar heat collection panel utilizes the convective properties of the heated air to draw cool air across the heat absorptive surfaces. The heated air can then be mixed with the air within an enclosure.

Solar heating systems are particularly attractive in situations where energy is either expensive or hard to obtain. One such situation is in the heating of beehives, which should be maintained at a relatively high temperature so that the bees remain productive. During the winter when the outside temperature is low, bees will consume honey to produce body heat to warm up the hive. This, of course, reduces the amount of honey that a beekeeper can sell. It has been found that if the brood nest area of the hive is kept near 94.1° F., the adult fliers will stop consuming the honey and will start to store new honey. Thus, proper heating of a beehive can make it vastly more productive.

In the past, the temperature within a beehive was raised by two basic techniques. A first technique was to feed the bees a yeast and syrup mixture so that they had enough food to both heat the hive and produce honey. The second technique was to artificially heat the hive with an electric heater. Both of these techniques tend to be prohibitively expensive, and often commercially infeasible. It has been calculated that, for a large scale honey operation, syrup and/or electric costs can run into thousands of dollars per month.

Beehives have been provided with solar heating systems in the past. For example, in U.S. Pat. No. 4,300,250 of Taylor a solar heater for beehives is disclosed including a solar collection box provided with a transparent wall through which solar radiation may enter, and a thermally conductive sheet located within the box to transmit heat to the beehive.

A problem with Taylor's solar heating system is that it is a relatively inefficient absorber of solar radiation. The transparent wall and conductive sheet of Taylor's collection box is vertical to the ground and thus will not collect a large portion of the solar radiation incident upon it. It has been well established in the prior art that a solar heating panel is maximally efficient only when it is angled such that, on the average, the incident solar radiation is perpendicular to the panel's surface.

Another problem with with Taylor's system is that it is cumbersomely heavy and large. Furthermore, the size of Taylor's system increases the cost of the system due to the large amount of materials required in its construction.

Solar heating systems are most often used to heat the air within habitable enclosures such as houses, apartments, and business premises. Such systems usually include a large array of solar heat collecting panels coupled to the central heating system and operated by an elaborate control system. These solar heating systems are very expensive to install and maintain.

Solar heating systems in general have a number of problems. For one, solar heating systems tend to be large, cumbersome, and non-portable. Furthermore, solar heating systems are, due to their large glass area, especially vulnerable to damage due to vandalism and exposure to the elements. Also, solar heating systems must often be provided with elaborate control systems so that they do not collect heat when it is not wanted, such as during the summer.

SUMMARY OF THE INVENTION

An object of this invention is to provide a portable, efficient solar heating system.

Another object of this invention is to provide a solar heating system which, in one embodiment, is particularly well adapted to heat a beehive.

Yet another object of this invention is to provide an efficient solar heating system which, in a second embodiment, can be retrofitted to a window frame.

A further object of this invention is to provide a solar heating system where the glass covering the panels can be protected against vandalism and environmental damage.

A still further object of this invention is to provide a solar heating system which has a simple, inexpensive means to reflect unwanted solar radiation when solar heating is not desired.

Briefly, the invention includes a fixed base assembly, and a movable collector assembly hinged to the base assembly that pivots between a closed position in which it overlies the base assembly, and an open, heating position where it gathers solar radiation. The base assembly, which can be designed to fit a beehive, window frame, or other enclosure opening, includes a first warm air duct and a first cool air duct. The collector assembly includes a second warm air duct, a second cool air duct, a divider panel separating the two ducts, and a transparent pane which allows solar radiation to impinge upon the divider panel. The air in the second warm air duct above the divider panel becomes heated and flows through the first warm air duct into the enclosure to be heated. The warm, rising air draws cool air from the enclosure through the first cool air duct and the second cool air duct to complete the cycle.

When the collector assembly is in its closed position, a reflective material attached to one of its sides will reflect away unwanted solar radiation to cool the air within the enclosure. A pair of reflective wings are provided to increase the solar radiation on the divider panel when the collector assembly is in its open or heating position. A solar powered fan can be provided to create a forced air flow.

An advantage of this invention is that it has two operative modes. In its closed mode the solar heating system serves to cool the air within the enclosure to which it is attached. In a open or heating mode, the solar heating system efficiently heats the air within the enclosure.

Another advantage of this invention is that it is both portable and rugged. It is easy to install and remove, yet is resistant to damage.

These and other objects and advantages of the present invention will no doubt become apparent upon a reading of the following descriptions and a study of the several figures of the drawing.

BRIEF DESCRIPTION OF THE DRAWING

FIG. 1 is a perspective view of a solar heating system of this invention attached to the top of a beehive. The solar heating system is shown in its closed position with the beehive lid raised up for clarity.

FIG. 2 is a perspective view of the solar heating system with its collector panel in its heating position.

FIG. 3 is a cross-sectional view taken along line 3—3 of FIG. 2.

FIG. 3A is an enlarged view of the portion of FIG. 3 encircled by broken line 3A.

FIG. 4 is a front elevational view of an alternate embodiment of this device attached to a window frame.

FIG. 5 is a cross-sectional view taken along line 5—5 of FIG. 4.

DETAILED DESCRIPTION OF THE PREFERRED EMBODIMENT(S)

Referring to FIG. 1, a solar heating system 10 in accordance with the present invention is attached to the top of a beehive 12 (sometimes known as a honey "super"). A beehive cover 14 is shown elevated above the heating system 10. Cover 14 can be replaced by additional honey supers or, alternatively, by a drilled cover for winter feeding.

Referring additionally to FIG. 2, the solar heating system 10 includes a fixed base assembly 16 and a movable collector assembly 18 that is attached to the base assembly 16 by hinges 20. Base assembly 16 is securely attached to the top of beehive 12, such as by nails, hive staples, screws or clamps. Collector assembly 18 can pivot between a closed position (as shown in FIG. 1) where it overlies and covers fixed base assembly 16, and a heating position (as shown in FIG. 2) where it is angled towards the sun.

As seen in FIG. 3 and 3A, a beehive 12 is usually a wooden, rectangular box having a base 22, a pair of endwalls 24 and 26, and a sidewall 28. The other sidewall 30 of beehive can be seen in FIGS. 1 and 2. The beehive 12 can be filled with racks of honeycomb to provide a home for a colony of bees. Beehive cover 14 is usually of a solid wood construction (but may be further provided with insulation), and is designed to act as a lid for the open top of beehive 12. A screen mesh is provided at the open end of shroud 50 to prevent bees from entering the fan area.

As mentioned previously, base assembly 16 is interposed between the beehive 12 and the cover 14. Base assembly 16 includes a frame 32 configured to engage the top of beehive 12, a first cool air duct 34, and a first warm air duct 36 defined as the space between a divider panel 38 and an upper panel 40.

A duct block 42 is provided between divider panel 38 and upper panel 40. A hole 44 is provided through divider panel 38 to allow warm air to flow from warm air duct 36 to a squirrel cage fan 46. A motor 48 attached to the underside of upper panel 40 drives the fan 36, and a shroud 50 directs the warm air towards endwall 24 of the beehive 12.

Referring again to FIG. 1, cool air duct 34 and warm air duct 36 open on an end 52 of fixed base assembly 16. End 52 is beveled at an angle "A" to the horizontal which is determined by the following formula:

bevel angle = [(latitude of the system) + 15°]/2

For example, for a beehive at latitude 67° the bevel angle is (67+15)/2=41°.

In FIGS. 3 and 2, movable collector assembly 18 includes a reflective side 54, an absorptive side 56, and a reflector wings 58 and 60. A divider panel 62 is located between reflective side 54 and absorptive side 56 to separate a second cool air duct 64 from a second warm air duct 66.

In FIG. 1, an end 68 of collector assembly 18 is beveled to match the bevel angle "A" of end 52 of base assembly 16. Second cool air duct 64 and second warm air duct 66 open on end 68. When the collector assembly 18 is opened to its heating position as shown in FIG. 2, first cool air duct 34 and second cool air duct 64 are connected together at ends 52 and 68, respectively, and first warm air duct 36 and second warm air duct 66 are similarly connected together. Gasket material can be placed around the openings of ducts 34, 36, 64, and 66 at the mitered ends of base assembly 16 and collector assembly 18 to minimize leakage at the joint between ends 52 and 68 when collector assembly 18 is in its heating position. However, the gasket materials may be omitted since bees will frequently seal such joints on their own.

Referring generally to FIGS. 1–3, reflective side 54 of collector assembly 18 includes a material 70 that is reflective to electromagnetic radiation in the infrared ranges. Material 70 could be a glass mirror, but more practically is a reflective plastic, such as mylar. A framework 72 attaches the reflective material 70 to reflective side 54.

Absorptive side 56 includes a clear pane 74 of glass or plastic, and an array of solar cells 76. The solar cells are coupled to motor 48 of the base assembly 16 by wires 78. Hinges 20 can also be used to conduct the elecricity generated by solar cells 76 from collector assembly 18 to base assembly 16.

Reflector wings 58 and 60 are hinged to the longitudinal edges of collector assembly 18 and are operative to fold out (as seen in FIG. 2) to reflect solar energy through pane 74 onto a solar heated surface 80 of divider 62. When the collector assembly 18 is in its closed position (as seen in FIG. 1) wings 58 and 60 are folded across pane 74 and solar cells 76 to protect them from damage.

The present invention has several modes of operation. As illustrated in FIG. 1, the collector assembly 18 can be folded over the top of base assembly 16 and hive cover 14 can be placed over reflective side 54 to protect it from the elements. This mode should be used during particularly harsh weather conditions, such as hail storms. In the summer time, hive cover 14 can be removed to expose reflective material 70. In this mode the hive 12 is actually cooled since incident solar radiation is reflected away from the hive, and since ducts 64 and 66 form "dead air" spaces which insulate the hive 12 from solar radiation falling on the top surfaces of the solar heating system 10.

When in the position shown in FIG. 1, duct 34 serves as an entrance and exit from the beehive 12. If the height of the duct 34 is chosen to be less than the size of a bee, and if the divider panel 38 is made from a flexible material, the opening of duct 34 can be opened to bee traffic by wedging in a small block or key, and can be closed to bee traffic by removing the block or key. Ducts 34, 36, 64, and 66 are covered by screen meshes (such as an 8×8 mesh) to prevent the bees from entering those ducts and possibly interfering with the functioning of the devices.

When collector assembly 18 is rotated to the position shown in FIGS. 2 and 3 the solar heating system 10 is in its heating configuration. The collector assembly is angled towards the sun by the beveled edges of ends 52 and 68 such that the incident radiation is substantially perpendicular to solar heated surface 80. Cool air duct 34 and cool air duct 64 are coupled together, and warm air duct 36 and warm air duct 66 are coupled together.

Solar radiation 82 warms the solar heated surface 80 and the air in warms air duct 66 above it. The warm air within duct 66 rises and flows through warm air duct 36 of base assembly 16 and out of shroud 50 towards endwall 24 of the hive 12. As the warm air cools it sinks to the base 22 of hive 12. The warm air flowing through ducts 66 and 36 draw cool air from hive 12 through cool air duct 34 and 64 to complete the loop.

It should be noted that the present invention will operate without fan 46, motor 48, and solar cells 76. The fan, however, will greatly increase the efficiency of the system by providing a forced air flow around the loop previously described. In fact, in one embodiment of the present invention, the fan moves 20–30 cubic feet of air per minute at temperatures between 80° F. and 90° F.

Referring now to the alternate embodiment of FIGS. 4 and 5, with a relatively few changes the solar heating system of the present invention can be converted into a window type solar heater. As such it is ideal for homes, businesses, and recreational vehicles.

The solar heating system 100 of this alternate embodiment is attached to a window frame 102 from which the glass had been removed. The solar heating system 100 includes a fixed base assembly 104, and a movable collector assembly 106 hinged to the base assembly 104. A pair of reflective wings 108 and 110 are attached to the longitudinal edges of collector assembly 106.

Base assembly 104 included a frame 112 having hollow side columns 114 and 116, and a base portion 118 provided with a first warm air duct 119 and a first cool air duct 121. The base assembly 104 is double glazed with an outer glass pane 120 and an inner glass pane 122. There is a dead air space between pane 120 and pane 122 to provide insulation.

Collector assembly 106 is attached to base assembly 104 by hinges 124. It can pivot between a closed position (not shown) where it substantially covers the base assembly 104, to the open, heating position shown in FIGS. 4 and 5. The collector assembly 106 includes a reflective side 126 and an absorptive side 128. The reflective side is provided with a support panel 130 covered with a reflective material 132, and the absorptive side 128 includes a pane of transparent material 134. A divider panel 136 extends towards the lower end 138 of collector assembly 106 from an upper end 140. The upper end 140 is provided with ducts which act as an extension of a second cool air duct 142 and a second warm air duct 144.

This alternate embodiment has two modes of operation. In a first mode, reflective wings 108 and 110 are folded across absorptive side 128, and the collector assembly 106 is closed over the base assembly 104. The collector assembly is held in position with a mechanical or magnetic latch (not shown). While in this closed configuration, the solar heating system 100 serves to cool the enclosure to which it is attached since incident solar radiation will be reflected away by reflective material 132 and since there is an additional dead air space created by ducts 142 and 144.

In the heating mode of FIGS. 4 and 5, solar radiation 146 passes through pane 134 to strike panel 136 heating the air within warm air duct 140. The warmed air will rise to flow though base portion 118 and up columns 114 and 116 of base assembly 104. The warm air will flow into the enclosure through warm air vents 148. The warm air rising in the warm air duct 140 will draw cool air from the enclosure through an intake 150 into the cool air ducts 142 to complete the cycle.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A solar heating system for an enclosure comprising:

a fixed base assembly attached over an opening in said enclosure and provided with a first cool air duct communicating with an enclosed space within said enclosure and a first warm air duct communicating with said enclosed space, and having an inner side facing said enclosed space and an outer side facing away from said enclosed space, said base assembly having a beveled first interface edge provided with a first cool air slot communicating with said first cool air duct and a first warm air slot communicating with said first warm air duct;

a movable collector assembly provided with a second cool air duct and a second warm air duct, and a solar heated surface over which air may flow from said second cool air duct to said second warm air duct, said collector assembly having a beveled second interface edge provided with a second cool air slot communicating with said second cool air duct and a second warm air slot communicating with said second warm air duct; and hinge means coupling said collector assembly to said fixed base assembly proximate said first beveled interface edge and said second beveled interface edge such that said collector assembly can move between a heating position where said first interface edge and said second interface edge abut in a miter such that said first cool air duct communicates with said second cool air duct through said first cool air slot and said second cool air slot and where said first warm air duct communicates with said second warm air duct through said first warm air slot and said second warm air slot, and a non-heating position where said collector assembly substantially overlies said base assembly.

2. A solar heating system as recited in claim 1 wherein the angle of said bevels of said first interface edge and said second interface edge are determined by the formula:

bevel angle=[(latitude of system)+15°]/2.

3. A solar heating system as recited in claim 1 wherein said first warm air duct couples said first warm air slot to a portion of said base assembly on said inner side that is distal from said first interface edge, and wherein said first cool air duct couples said first cool air slot to a portion of said base assembly on said inner side that is proximate said first interface edge.

4. A solar heating system as recited in claim 1 wherein said fixed assembly further includes fan means for drawing warm air through said first warm air duct from said collector assembly.

5. A solar heating system as recited in claim 1 wherein said fixed base assembly includes a divider extending from said first interface edge towards a distal edge to separate said first warm air duct from said second warm air duct.

6. A solar heating system as recited in claim 1 further comprising a lid covering said outer side of said base assembly when said movable collector is in said heating position.

7. A solar heating system as recited in claim 1 wherein said fixed base assembly includes vertical side frame members provided with said warm air ducts, said side frame members releasing warm air into said enclosed space proximate an upper edge thereof.

8. A solar heating system as recited in claim 7 wherein said fixed base assembly further includes a double glazing of glass extending between said vertical side frame members.

9. A solar heating system for an enclosure comprising:
a fixed base assembly provided with a first cool air duct communicating with an enclosed space within said enclosure and a first warm air duct communicating with said enclosed space, said base assembly having an inner side facing said enclosed space and an outer side facing away from said enclosed space, said base assembly further having a first interface edge with a first cool air slot and a first warm air slot, where said first warm air duct couples said first warm air slot to a portion of said base assembly on said inner side that is distal from said first interface edge and where said first cool air duct couples said first cool air slot to a portion of said base assembly on said inner side that is proximate said first interface edge, said base assembly further including fan means for drawing warm air through said first warm air duct from said collector assembly, and a first frame member adapted to engage an opening in said enclosure;
a movable collector assembly provided with a second cool air duct and a second warm air duct, and a solar heated surface over which air may flow from said second cool air duct to said second warm air duct, said collector assembly futher including a second interface edge adapted to abut said first interface edge, said second interface edge having a second cool air slot and second warm air slot which may align with said first cool air slot and said second cool air slot, respectively;
means coupling said collector assembly to said fixed base assembly such that said collector assembly can move between a heating position where said first cool air duct communicates with said second cool air duct and where said first warm air duct communicates with said second warm air duct, and a non-heating position where said collector assembly substantially covers said base assembly; and
means covering said outer side of said base assembly when said collector assembly is in said heating position.

10. A solar heating system for an enclosure comprising:
a fixed base assembly provided with a first cool air duct communicating with an enclosed space within said enclosure and a first warm air duct communicating with said enclosed space, said base assembly having an inner side facing said enclosed space and an outer side facing away from said enclosed space, said base assembly including a first interface edge having a first cool air slot and a first warm air slot, said base assembly further including a first frame member adapted to engage an opening in said enclosure;
a movable collector assembly provided with a second cool air duct and a second warm air duct, and a solar heated surface over which air may flow from said second cool air duct to said second warm air duct, said collector assembly further including a second interface edge adapted to abut said first interface edge, said second interface edge having a second cool air slot and second warm air slot corresponding to said first cool air slot and said second cool air slot, respectively;
means coupling said collector assembly to said fixed base assembly such that said collector assembly can move between a heating position where said first cool air duct communicates with said second cool air duct and where said first warm air duct communicates with said second warm air duct, and a non-heating position where said collector assembly substantially covers said base assembly; and
where said collector assembly has a solar collection side which faces outwardly when said collector assembly is in said heating position, and a solar reflection side which faces outwardly when said collector assembly is covering said outer side of said base assembly.

11. A solar heating system as recited in claim 10 wherein said collector assembly further includes a divider disposed between said solar collection side and said solar reflection side and extending from said second interface edge towards a distal end of said collector assembly, said divider separating said second cool air duct from said second warm air duct and forming a part of said solar heated surface.

12. A solar heating system as recited in claim 11 wherein said solar reflection side includes reflective means attached to said second frame.

13. A solar heating system as recited in claim 12 further comprising a pair of reflective wings hinged to said second frame, said wings having a closed position where they cover said solar collection side, and an open position where they direct solar radiation to said solar collection side.

* * * * *